(12) United States Patent
Grayson (10) Patent No.: US 11,445,372 B2
(45) Date of Patent: Sep. 13, 2022

(54) SCALABLE PUBLIC KEY IDENTIFICATION MODEL

(71) Applicant: Cisco Technology, Inc., San Jose, CA (US)

(72) Inventor: Mark Grayson, Berkshire (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 462 days.

(21) Appl. No.: 16/561,949

(22) Filed: Sep. 5, 2019

(65) Prior Publication Data

US 2021/0076215 A1 Mar. 11, 2021

(51) Int. Cl.
*H04W 12/084* (2021.01)
*H04W 12/069* (2021.01)
*H04L 61/4511* (2022.01)

(52) U.S. Cl.
CPC ....... *H04W 12/084* (2021.01); *H04L 61/1511* (2013.01); *H04W 12/069* (2021.01)

(58) Field of Classification Search
None
See application file for complete search history.

(56) References Cited

U.S. PATENT DOCUMENTS

| 10,341,328 | B2* | 7/2019 | Gupta | H04L 41/0806 |
|---|---|---|---|---|
| 11,283,797 | B2* | 3/2022 | Laucius | H04L 63/0884 |
| 11,284,254 | B2* | 3/2022 | Rune | H04L 63/0884 |
| 11,297,055 | B2* | 4/2022 | Momchilov | H04L 63/0884 |
| 11,310,106 | B2* | 4/2022 | Singla | H04W 12/062 |
| 2005/0063333 | A1* | 3/2005 | Patron | H04W 12/084 370/329 |
| 2006/0182061 | A1* | 8/2006 | Naghian | H04W 12/068 370/331 |
| 2008/0014931 | A1* | 1/2008 | Yared | H04L 61/1547 455/432.3 |
| 2009/0113537 | A1* | 4/2009 | Woo | H04L 63/0884 726/12 |
| 2010/0082975 | A1* | 4/2010 | Metke | H04L 63/064 713/157 |

(Continued)

OTHER PUBLICATIONS

Mockapetris; Domain names—implementation and specification; 1987; Retrieved from the internet https://www.rfc-editor.org/rfc/pdfrfc/rfc1035.txt.pdf; pp. 1-55, as printed. (Year: 1987).*

(Continued)

*Primary Examiner* — Michael W Chao
(74) *Attorney, Agent, or Firm* — Polsinelli (57) ABSTRACT

The present technology pertains to a system, method, and non-transitory computer-readable medium for confirming the identities of devices requesting roaming access on a network by authoritative identity providers and proxies for authoritative identity providers. The technology can, in response to a receipt of a request from a device for roaming access, connect to an identity entity at an address by a network access provider, wherein the request for roaming access identifies an authoritative identity provider host name; receive a certificate from the identity entity; and determine, using the certificate, whether the identity entity is an authoritative identity provider or a proxy for an authoritative identity provider.

14 Claims, 4 Drawing Sheets

(56) References Cited

U.S. PATENT DOCUMENTS

| | | | | |
|---|---|---|---|---|
| 2010/0251330 A1* | 9/2010 | Kroeselberg | ........ | H04W 12/069 |
| | | | | 726/3 |
| 2013/0031615 A1* | 1/2013 | Woodward | .......... | H04W 12/084 |
| | | | | 726/4 |
| 2013/0212663 A1* | 8/2013 | Edge | ....................... | H04W 4/02 |
| | | | | 726/7 |
| 2013/0311771 A1* | 11/2013 | Hoggan | ................ | H04L 9/3268 |
| | | | | 713/156 |
| 2017/0289799 A1* | 10/2017 | Hawkes | ................ | H04L 63/083 |
| 2018/0295506 A1* | 10/2018 | Hawkes | ................ | H04L 9/3265 |
| 2019/0215692 A1 | 7/2019 | Grayson et al. | | |
| 2022/0060468 A1* | 2/2022 | Brown | ................ | H04W 12/069 |

OTHER PUBLICATIONS

International Search Report and Written Opinion from the International Searching Authority, dated Nov. 23, 2020, 11 pages, for corresponding International Patent Application No. PCT/US2020/048948.

* cited by examiner

SCALABLE PUBLIC KEY IDENTIFICATION MODEL

TECHNICAL FIELD

The present technology pertains to a system for confirming identities of devices requesting roaming access to a network, and more specifically to utilizing certificates from identity entities to determine whether the identity entity is an authoritative identity provider or a proxy for an authoritative identity provider.

BACKGROUND

Network owners and administrators desire to protect their networks from bad actors and wish to verify identities of devices requesting access to their networks. While infrastructure exists for this purpose, this infrastructure is diverse and not scalable.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

The present technology pertains to validating network connections to authoritative identity providers and proxies for authoritative identity providers. The present technology can, in response to a receipt of a request from a device for roaming access, connect to an identity entity at an address by a network access provider, wherein the request for roaming access identifies an authoritative identity provider host name. Once connected, it can receive a certificate from the identity entity and determine, using the certificate, whether the identity entity is an authoritative identity provider or a proxy for an authoritative identity provider.

Example Embodiments

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Network providers desire to protect their networks from being accessed by bad actors. This is difficult to do when a network provider is offering roaming access to devices. Roaming access might be offered on a public Wi-Fi network, for example, such as that might be found at an airport, a mall, a stadium, other public or semi-public spaces. Since the goal of such a network is to allow visitors to access the network, the network provider cannot and does not have accounts to authenticate each user. However, the users do have devices that are issued by known providers that can act as identity entities, and so network providers sometimes adopt a policy of checking with the identity entities that issued the device to ensure that the device was in fact issued by that identity entity. Examples of identity entities can be Verizon, ATT, or other mobile phone issuers, but are not limited to mobile phone providers.

Since network providers trust determinations about whether a device is known to an identity entity, the network provider needs to at least be able to verify that they are communicating with an identity entity that is authorized to verify identity for a particular device. The network provider needs to ensure that they are not interacting with a third party pretending to be the identify entity.

However, there are competing protocols and standards for mechanisms by which to verify that an identity entity is authorized to verify identity for a particular device. Additionally, some identity entities are proxies for the true authoritative identity entity and these proxies may be authenticated by a different mechanism than the authoritative identity provider. Some of these mechanisms are also prone to failure because the mechanisms do not scale well. The disclosed technology addresses the need in the art for scalable validation of identity providers that can harmonize competing protocols and standards.

Figure 1:
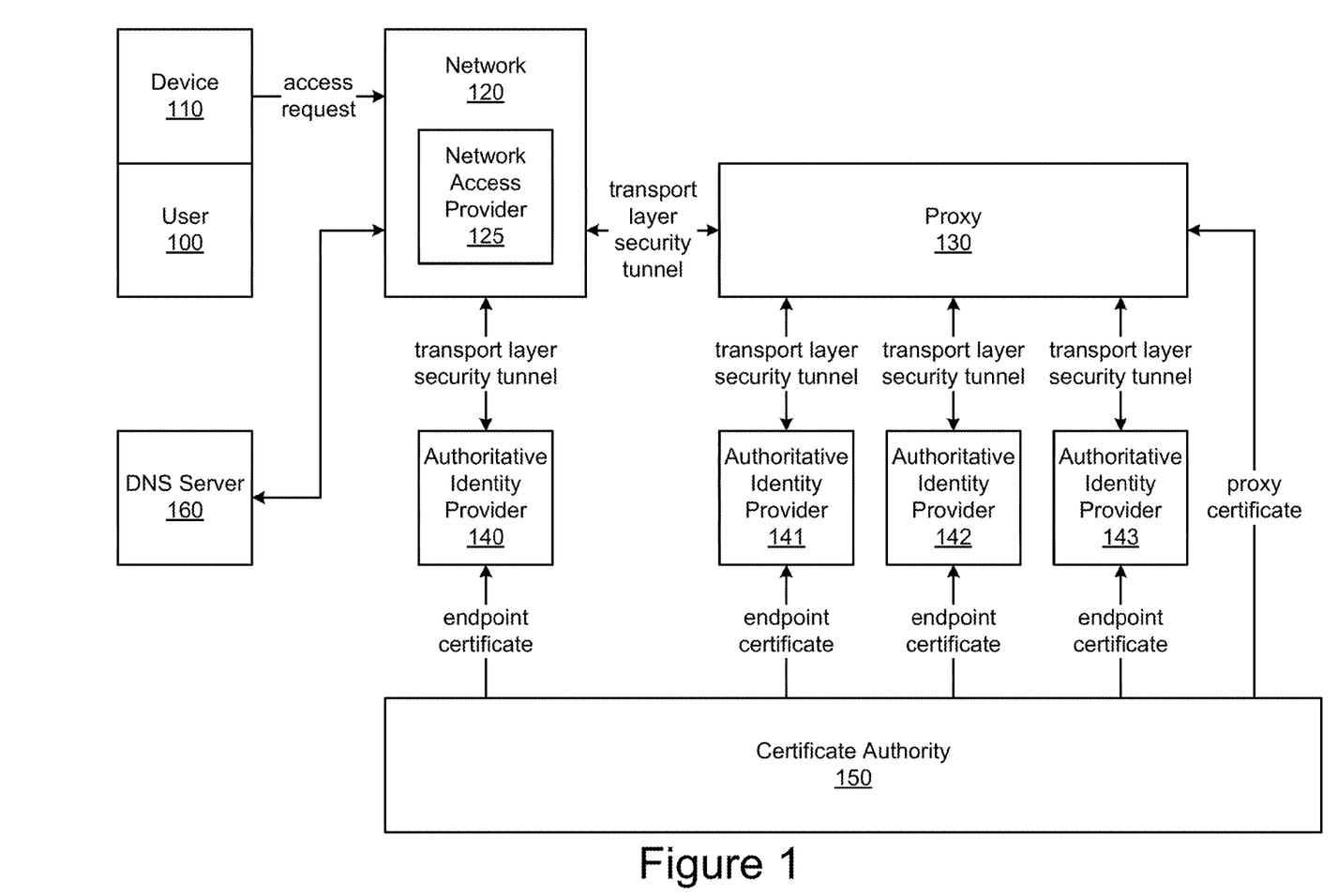
FIG. 1 illustrates an example configuration of devices and a network in accordance with some aspects of the present technology.

FIG. 1 illustrates an exemplary configuration of devices and a network in accordance with some aspects of the present technology. A device sends an access request containing an authoritative identity provider host name to a network access provider; in response, the network determines whether it has a cached, current address for such an authoritative identity provider. If the network access provider does not have a current address for the authoritative identity provider, it can use a discovery procedure to dynamically discover the current address. In some embodiments, the discovery procedure comprises recovering the authoritative identity provider host name from the access request sent by the device and looking up the name in a hierarchical naming system, for example by using the Domain Name System (DNS) protocol. The network proceeds, connecting to either an authoritative identity provider or to a proxy (collectively "identity entities") by a transport layer security tunnel. Along this tunnel, it receives an identification certificate from the authoritative identity provider or the proxy for the authoritative identity provider. This certificate identifies the identity entity as an authoritative identity provider or a proxy and confirms identification of the requesting device.

User 100 operates Device 110 to send a roaming access request containing an authoritative identity provider host name to Network 120, which is provided by a third party. This third party does not have a pre-existing relationship with User 100 or Device 110. Network Access Provider 125 receives the request and ultimately allows or declines roaming access.

User 100 can be an individual requesting roaming access to a public or semi-public network, such as networks found in stadiums, malls, libraries, airports, or guest networks corresponding to private networks in centers of business or government. Device 110 can be a personal device, such as a laptop or mobile phone. Network 120 can be a Wi-Fi network, a cellular network, or a local-area network.

Proxy 130 is an intermediate hub between Network 120 and Authoritative Identity Providers 141, 142, and 143 which can validate the identity of Device 110 for Network 120. Transport layer security tunnels facilitate the exchange of certificates issued by Certificate Authority 150. These certificates confirm the authority of Authoritative Identity Providers 140, 141, 142, and 143 and the authority of Proxy 130 as a proxy for authoritative identity providers.

Certificate Authority 150 can be an entity that issues public-key infrastructure certificates in compliance with different identification and validation protocols.

If Network 120 has a cached and current address for Authoritative Identity Provider 140, it will not need to contact DNS Server 160 to obtain an address for an identity entity. However, in other circumstances, it will need to request and receive such an address from DNS Server 160. In some cases, DNS Server 160 can direct Network Access Provider 125 to contact an Authoritative Identity Provider 140, 141, 142, or 143 directly, while in other cases DNS Server 160 can direct Network Access Provider 125 to contact Proxy 130 for multiple Authoritative Identity Providers 141, 142, and 143.

Some identity entities, like Authoritative Identity Provider 140, can be directly communicated with by Network 120. Other identity entities, like Authoritative Identity Providers 141, 142, or 143, are only accessible to Network 120 via Proxy 130.

Figure 2:
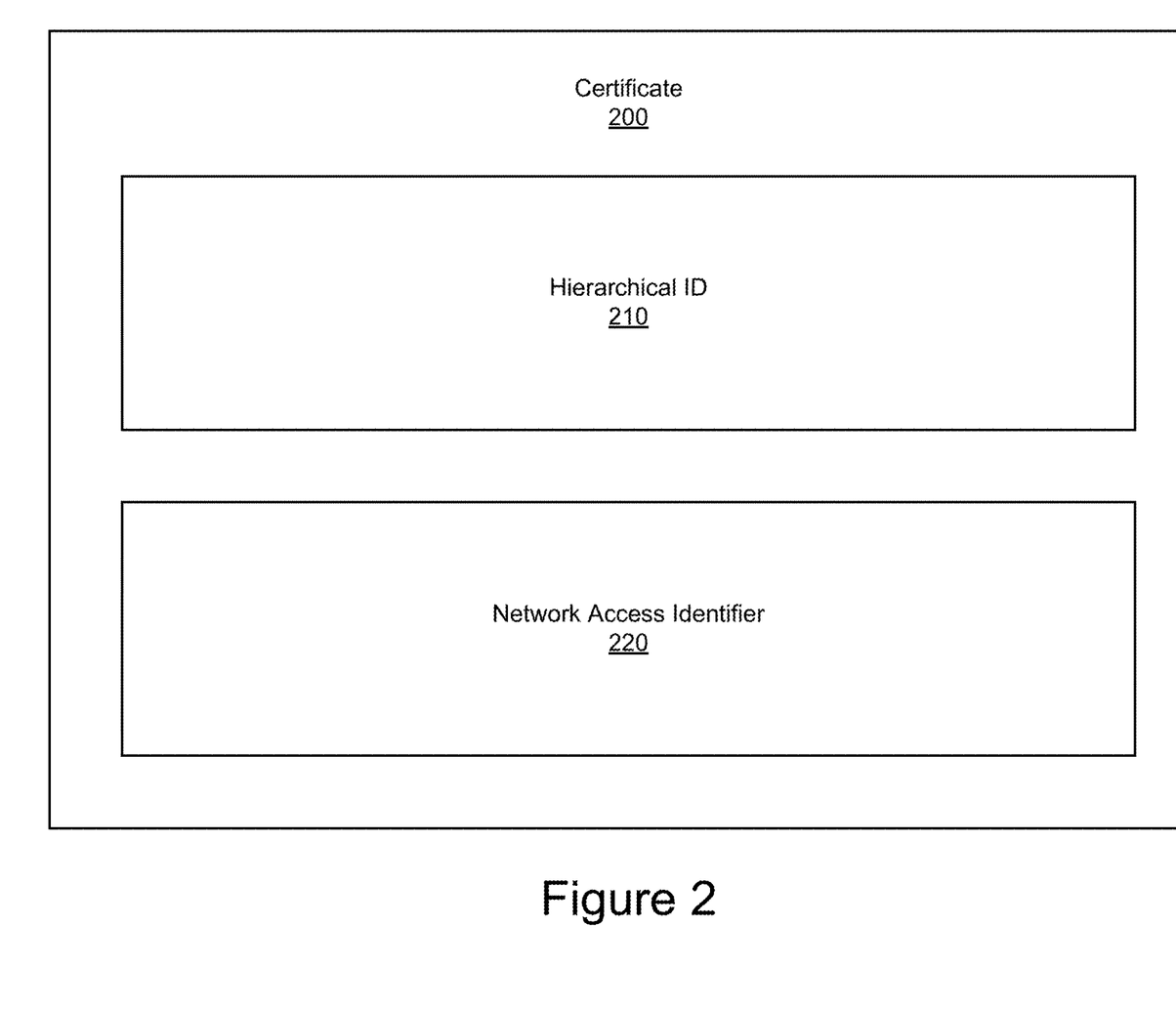
FIG. 2 illustrates a detail of the of the configuration of devices and a network shown in FIG. 1 in accordance with some aspects of the present technology.

FIG. 2 illustrates a detail of the certificate received from an identity entity by Network Access Provider 125.

Certificate 200 holds information to validate an identity entity as Proxy 130 or as one of Authoritative Identity Providers 140, 141, 142, or 143. Hierarchical ID 210 provides the ID that identifies whether an identity entity is an authoritative identity provider or a proxy. Network Access Identifier 220 includes information which allows for comparison between the identity provider host name in the request and the identity provider host name for an authoritative identity provider.

In some embodiments, Hierarchical ID 210 can be a number. For instance, IDs greater than a number, or IDs with a particular prefix can identify proxies like Proxy 130 for authoritative identity providers like Authoritative Identity Providers 140 or 141. IDs less than or equal to the number, or IDs with a different particular prefix, can identify authoritative identity providers like Authoritative Identity Providers 140 or 141. In other embodiments, Hierarchical ID 210 may be a structured string with delimiters used to separate components of a string. For instance, IDs with a single component can identify proxies like Proxy 130 and IDs with a double component can identify authoritative identity providers like Authoritative Identity Providers 140, 141, 142, or 143.

Within a single ID, information identifying the class of the identity entity as either an authoritative identity provider or as a proxy allows Network Access Provider 125 to appropriately interact with Authoritative Identity Provider 140 or Proxy 130.

When Certificate 200 is a certificate for an authoritative identity provider, Network Access Identifier 220 contains the host name of the authoritative identity provider. Some example host names for authoritative identity providers include facebook.com or verizon.com. Network 120 checks this field when it connects to Authoritative Identity Provider 140 to ensure that the host name in the request matches the host name in Certificate 200. However, when Certificate 200 is a certificate for Proxy 130, Certificate 200 does not necessarily include the host name. This avoids the need for Proxy 130 to get an updated certificate that includes the host name whenever Proxy 130 takes responsibility for another domain.

Figure 3:
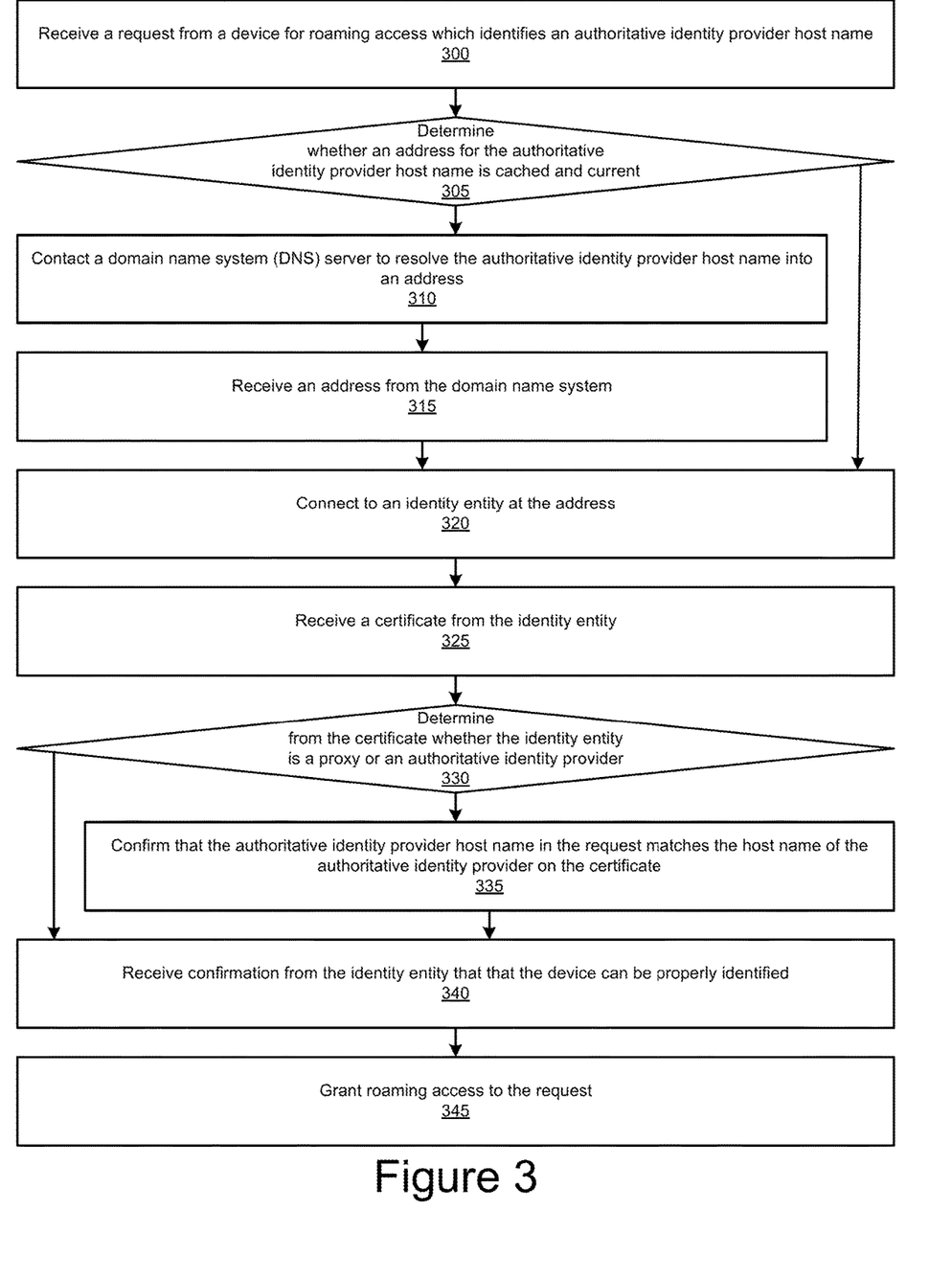
FIG. 3 illustrates an example method embodiment in accordance with some aspects of the present technology.

FIG. 3 illustrates an example method in accordance with some embodiments of the present technology, and can be carried out by the system described in FIG. 1. However, nothing in FIG. 3 should be considered limiting of the system illustrated in FIG. 1, and likewise, the system illustrated in FIG. 1 should not be interpreted to limit the method of FIG. 3. Any limitation of the depicted system or method will be recited in the appended claims.

The method begins when Network 120 receives (300) a roaming access request sent by User 100 via Device 110. As Network 120 is a third-party network, Network Access Provider 125 must allow or decline roaming access to the request. The request identifies a host name for an authoritative identity provider, such as Authoritative Identity Provider 140, 141, 142, or 143. In order to service this request, Network 120 must determine (305) whether it has cached an address for the authoritative identity provider, and if so, if that cached address is current.

For example, User 100 can be a patron at an airport hoping to access the airport's Wi-Fi network, Network 120, before a flight. Device 110 can be User 100's device issued by a carrier. When User 100 tries to access Network 120, the airport has an interest in knowing the identity of User 100 and Device 110 to determine the likelihood that User 100 is a malicious actor, and therefore is interested in validating the identity of Device 110.

If Network 120 has a current cached address for the authoritative identity provider, it will connect (320) to an identity entity at that address, such as Authoritative Identity Provider 140 or Proxy 130. If not, it will contact (310) DNS Server 160 to resolve the authoritative identity provider host name into an address, and from which it receives (315) an address before proceeding to connect (320) to the identity entity at that address. The identity entity contacted using a DNS-provided address can be an authoritative identity entity like Identity Provider 140 or a proxy like Proxy 130.

If Network 120 had previously accepted roaming requests from other devices issued by the same carrier, that carrier's address may be cached and current. In this case, Network 120 can directly contact the carrier's address to validate the identity of Device 110. If, however, there are no recent roaming requests, then Network 120 will need to get an address from DNS Server 160 and then make a connection.

Once connected to an identity entity, Network 120 receives (325) a Certificate 200 from the identity entity.

From Certificate 200, Network 120 determines (330) whether the identity entity is an authoritative identity entity or a proxy. This determination is achieved using Hierarchical ID 210 on Certificate 200. Hierarchical ID 210 contains information that allows Network 120 to identify the connected identity entity as an authoritative entity provider or as a proxy. This can be done by a thresholding function if the hierarchical ID is a number, letter-signifiers if the hierarchical ID is a string, or by some other means.

If Network 120 determines (330) that Hierarchical ID 210 on Certificate 200 identifies an authoritative identity provider like Authoritative Identity Provider 140, which is not behind Proxy 130, it needs to confirm (335) that the authoritative identity provider host name in the request matches the host name present on Certificate 200. The host name is contained in Network Access Identifier 220 on Certificate 200. Network Access Identifier 220 is populated with a host name on certificates issued to authoritative identity providers, but is either unpopulated or ignored on certificates issued to proxies for authoritative identity providers.

Before granting roaming access to a request, Network Access Provider 125 receives (340) confirmation that Device 110 can be properly identified by the identity entity. Once Device 110 is identified by the identity entity, Network Access Provider 125 grants (345) roaming access to Network 120 to the request.

Authoritative identity providers like Authoritative Identity Provider 140 can directly authorize the identity of Device 110. For instance, if Verizon services a phone, it can then identify that device. For proxies like Proxy 130, Network 120 will not be able to confirm the Network Access Identifier 220 of an authoritative identity provider like Authoritative Identity Providers 141, 142, or 143. To trust Proxy 130, aside from receiving a Certificate 200 issued by Certificate Authority 150, Network 120 can have a pre-existing trusting relationship with Proxy 130.

Figure 4:
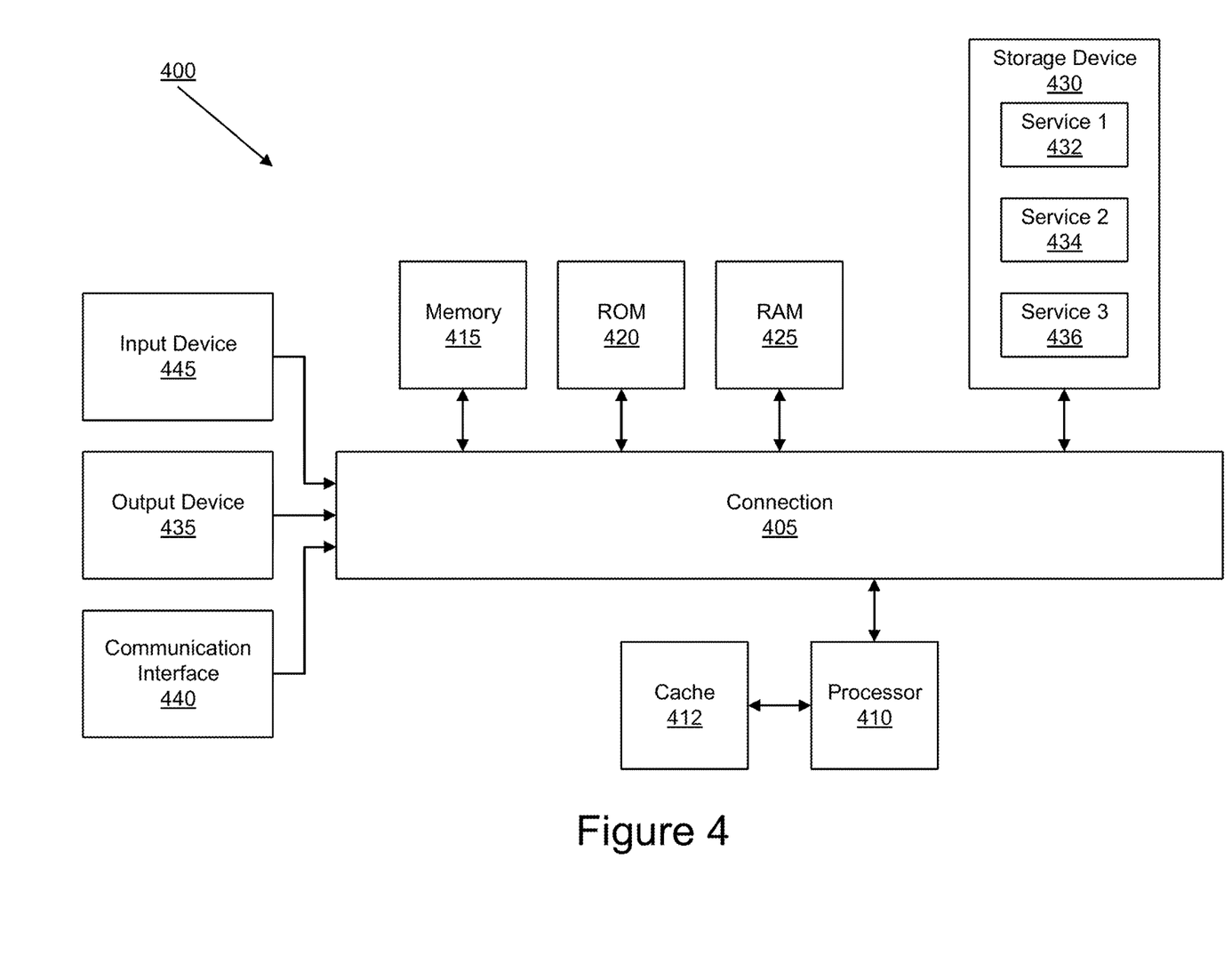
FIG. 4 illustrates an example system configuration in accordance with some aspects of the present technology.

FIG. 4 shows an example of computing system 400, which can be for example any computing device making up Temporal Event Detector 102, Data Delimiter 104, Peer Comparison Service 106, Temporal Peer Comparison Service 116, or any component thereof in which the components of the system are in communication with each other using connection 405. Connection 405 can be a physical connection via a bus, or a direct connection into processor 410, such as in a chipset architecture. Connection 405 can also be a virtual connection, networked connection, or logical connection.

In some embodiments computing system 400 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 400 includes at least one processing unit (CPU or processor) 410 and connection 405 that couples various system components including system memory 415, such as read only memory (ROM) 420 and random access memory (RAM) 425 to processor 410. Computing system 400 can include a cache of high-speed memory 412 connected directly with, in close proximity to, or integrated as part of processor 410.

Processor 410 can include any general purpose processor and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms known to those of skill in the art. In some instances, multimodal systems can enable a user to provide multiple types of input/output to communicate with computing system 400. Computing system 400 can include communications interface 440, which can generally govern and manage the user input and system output. There is no restriction on operating on any particular hardware arrangement and therefore the basic features here may easily be substituted for improved hardware or firmware arrangements as they are developed.

Storage device 430 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 430 can include software services, servers, services, etc., that when the code that defines such software is executed by the processor 410, it causes the system to perform a function. In some embodiments, a hardware service that performs a particular function can include the software component stored in a computer-readable medium in connection with the necessary hardware components, such as processor 410, connection 405, output device 435, etc., to carry out the function.

The system disclosed in the present technology solves a pressing need in the art. Verifying the identities of devices seeking roaming access on a network is necessary to shield networks from malicious actors; further, ensuring that this device identification process is trustworthy and scalable is a necessity for maintaining secure and enforceable access policies. The present technology solves the need in the art by addressing secure identity validation and doing so in a scalable manner.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A non-transitory computer readable medium comprising instructions stored thereon, wherein the instructions are effective to cause at least one processor to:
   in response to a receipt of a request from a device for roaming access, connect to an identity entity at an address by a network access provider, wherein the request for roaming access identifies a host name of an authoritative identity provider;
   receive a certificate from the identity entity;
   determine, using the certificate, whether the identity entity is the authoritative identity provider or a proxy for the authoritative identity provider;
   in response to determining that the identity entity is the authoritative identity provider:
      confirm that the authoritative identity provider host name matches data on the certificate;
      receive confirmation from the authoritative identity provider that the device can be properly identified by the authoritative entity provider; and
      grant the device roaming access to a network associated with the network access provider, in response to the network access provider accepting the certificate of the authoritative entity provider and the device identification confirmation from the authoritative entity provider;
   in response to determining that the identity entity is a proxy of the authoritative identity provider:
      receive confirmation from the proxy for the authoritative entity provider that the device can be properly identified by the proxy for the authoritative entity provider; and
      grant the device roaming access to a network associated with the network access provider, in response to the network access provider accepting the certificate of the proxy for the authoritative entity provider and the device identification confirmation from the proxy for the authoritative entity provider.

2. The non-transitory computer readable medium of claim 1, wherein the instructions are further effective to cause the at least one processor to:
   contact a domain name system (DNS) server to resolve the authoritative identity provider host name into the address; and
   receive by the network access provider a response from the domain name system (DNS) server indicating the address.

3. The non-transitory computer readable medium of claim 1, wherein the network access provider accepts the certificate of the proxy for the authoritative entity provider without requiring the authoritative identity provider host name to be listed in the certificate for the proxy for the authoritative entity provider.

4. The non-transitory computer readable medium of claim 1, wherein the certificate identifies the identity entity by a hierarchical unique ID which identifies the identity entity as the authoritative identity provider or the proxy for the authoritative identity provider.

5. The non-transitory computer readable medium of claim 1, wherein the network access provider controls access to a Wi-Fi network.

6. A system comprising:
   a network access provider, which, in response to receipt of a request from a device for roaming access, connects to an identity entity at an address, wherein the request for roaming access identifies an authoritative identity provider host name;
   a device, which sends a request for roaming access;
   an identity entity, from which the network access provider receives a certificate and determines, using the certificate, whether the identity entity is an authoritative identity provider or a proxy for an authoritative identity provider;
   the network access provider, in response to determining that the identity entity is the authoritative identity provider, is programmed to:
      confirm that the authoritative identity provider host name matches data on the certificate;

receive confirmation from the authoritative identity provider that the device can be properly identified by the authoritative entity provider; and grant the device roaming access to a network associated with the network access provider, in response to the network access provider accepting the certificate of the authoritative entity provider and the device identification confirmation from the authoritative entity provider;

the network access provider, in response to determining that the identity entity is a proxy of the authoritative identity provider, is programmed to:

receive confirmation from the proxy for the authoritative entity provider that the device can be properly identified by the proxy for the authoritative entity provider; and grant the device roaming access to a network associated with the network access provider, in response to the network access provider accepting the certificate of the proxy for the authoritative entity provider and the device identification confirmation from the proxy for the authoritative entity provider.

7. The system of claim 6, further comprising:
A domain name system (DNS) server which resolves the authoritative identity provider host name into the address and sends the network access provider a response from indicating the address.

8. The system of claim 6, wherein the network access provider is configured to accept the certificate of the proxy for the authoritative entity provider without requiring the authoritative identity provider host name to be listed in the certificate for the proxy for the authoritative entity provider.

9. The system of claim 6, wherein the certificate is configured to identify the identity entity by a hierarchical unique ID which identifies the identity entity as the authoritative identity provider or the proxy for the authoritative identity provider.

10. The system of claim 6, wherein the network access provider is configured to control access to a Wi-Fi network.

11. A method comprising:
connecting to an identity entity at an address by a network access provider in response to receiving a request from a device for roaming access, wherein the request for roaming access identifies a host name of an authoritative identity;
receiving a certificate from the identity entity; and
determining, using the certificate, whether the identity entity is the authoritative identity provider or a proxy for the authoritative identity provider;

in response to determining that the identity entity is the authoritative identity provider:
confirm that the authoritative identity provider host name matches data on the certificate;
receive confirmation from the authoritative identity provider that the device can be properly identified by the authoritative entity provider; and
grant the device roaming access to a network associated with the network access provider, in response to the network access provider accepting the certificate of the authoritative entity provider and the device identification confirmation from the authoritative entity provider;

in response to determining that the identity entity is a proxy of the authoritative identity provider:
receive confirmation from the proxy for the authoritative entity provider that the device can be properly identified by the proxy for the authoritative entity provider; and
grant the device roaming access to a network associated with the network access provider, in response to the network access provider accepting the certificate of the proxy for the authoritative entity provider and the device identification confirmation from the proxy for the authoritative entity provider.

12. The method of claim 11 further comprising:
contacting a domain name system (DNS) server to resolve the authoritative identity provider host name into the address; and
receiving by the network access provider a response from the domain name system (DNS) server indicating the address.

13. The method of claim 11, wherein the accepting of the certificate of the proxy for the authoritative entity provider comprises not requiring the authoritative identity provider host name to be listed in the certificate for the proxy for the authoritative entity provider.

14. The method of claim 11, wherein the certificate identifies the identity entity by a hierarchical unique ID which identifies the identity entity as the authoritative identity provider or the proxy for the authoritative identity provider.

* * * * *